United States Patent [19]

Kreuttner

[11] 4,447,372

[45] May 8, 1984

[54] METHOD AND APPARATUS FOR MOLDING PARTS HAVING AN ASPHERICAL SURFACE

[75] Inventor: Albert Kreuttner, Aalen, Fed. Rep. of Germany

[73] Assignee: Carl-Zeiss-Stiftung, Oberkochen, Fed. Rep. of Germany

[21] Appl. No.: 367,920

[22] Filed: Apr. 13, 1982

[30] Foreign Application Priority Data

May 2, 1981 [DE] Fed. Rep. of Germany ....... 3117474

[51] Int. Cl.³ .......................... B29D 11/00; B29F 1/06
[52] U.S. Cl. .................................. 264/2.2; 264/313; 264/328.7; 425/808
[58] Field of Search ................... 264/2.2, 316, 2.5, 1.1, 264/315, 314, 313, 1.7, 1.8, 1.9, 2.4, 328.7; 425/DIG. 808

[56] References Cited

U.S. PATENT DOCUMENTS

| | | | |
|---|---|---|---|
| 2,292,917 | 8/1942 | Williams | 264/2.2 X |
| 2,406,361 | 8/1946 | Fairbank et al. | 264/2.2 X |
| 2,848,753 | 8/1958 | Anspon et al. | 264/316 |
| 3,273,204 | 9/1966 | Craddock | 264/2.4 X |
| 3,361,858 | 1/1968 | Wichterle | 264/2.2 X |
| 3,460,928 | 8/1969 | Casko | 264/2.2 X |
| 3,840,977 | 10/1974 | Dimitracopoulos | 425/808 X |
| 3,938,775 | 2/1976 | Sarofeen | 264/2.2 X |
| 4,018,587 | 4/1977 | Maitenaz | 264/2.5 X |
| 4,188,353 | 2/1980 | Neefe | 264/2.5 |
| 4,251,474 | 2/1981 | Blandin | 264/1.1 |
| 4,257,988 | 3/1981 | Matos et al. | 425/808 X |

FOREIGN PATENT DOCUMENTS

| | | | |
|---|---|---|---|
| 2519708 | 11/1975 | Fed. Rep. of Germany | 425/808 |
| 916377 | 1/1963 | United Kingdom | 264/2.2 |

Primary Examiner—Thomas P. Pavelko
Assistant Examiner—James C. Housel
Attorney, Agent, or Firm—Hopgood, Calimafde, Kalil, Blaustein & Judlowe

[57] ABSTRACT

Molded thermoplastic parts with aspherical surfaces are produced with molds whose molding-cavity surfaces are of spherical development and are elastically deformable. The spherical surfaces are so deformed in specific manner by the pressure of the thermoplastic material during the molding process that predetermined aspherical surfaces are produced. Aspherical surfaces of non-rotational symmetry are produced by additional, yieldably mounted auxiliary pistons which are connected to a hydraulic system.

13 Claims, 4 Drawing Figures

METHOD AND APPARATUS FOR MOLDING PARTS HAVING AN ASPHERICAL SURFACE

BACKGROUND OF THE INVENTION

The present invention relates to a method and apparatus for producing molded thermoplastic parts having aspherical surfaces, using mold components with cavity-limiting surfaces. The method and apparatus of the invention have particular use in the manufacture of continuous-focus eyeglass lenses.

In known methods for molding thermoplastic parts, namely by injection-molding or compression-molding, particular importance must be placed on the molding-cavity surfaces being sufficiently rigid that the molded product is given precisely the form desired. This is particularly true when, to produce surfaces of optical quality it is necessary to operate with high pressure during the manufacturing process.

It is known that aspherical surfaces can be produced in the molding of thermoplastic parts. For this purpose, it has been the practice to provide corresponding aspherical surfaces in the mold cavity. The production of such complex surfaces is extremely expensive, due in particular also to the above-mentioned need for rigidity. Such production expense is particularly unfavorable in the manufacture of eyeglass lenses having aspherical surfaces, when a whole series of lenses of different dioptric powers is required, thus dictating the need for a very large number of different aspherical surfaces.

BRIEF STATEMENT OF THE INVENTION

The object of the present invention is to provide a method and an apparatus which can produce molded aspherical parts from thermoplastic material, using molds which are not complex and which are therefore relatively inexpensive.

The invention achieves this object by providing a mold with at least one molding-cavity surface that is spherical and elastically deformable, and by using pressure of the involved thermoplastic material to so deform this surface of the molding cavity during the manufacturing process that a predetermined aspherical surface results in the molded product.

A mold for carrying out the method of the invention is characterized by the fact that at least one of two piston components of a molding die is provided with a cup-shaped recess over which an elastically deformable molding plate is positioned.

For a predetermination of how molding-cavity surfaces (molding plates) deform under given conditions and how external conditions must be selected for a given deformation to take place, the known finite element method is advisedly used (see, for example, O. C. Zienkiewicz, "The Finite Element Method"). The conditions can also be determined experimentally, and in certain cases this method is even better since it requires less expense. For this reason, the expression "predeterminable" has been adopted herein.

In one advantageous embodiment of the invention, the edge and/or clamping conditions of deformable molding plates are important variable parameters, to be considered in addition to the thickness and radii of the spherical molding plates, as well as the pressure of the material involved in the injection or compression process.

In the production of aspherical surfaces of non-rotational symmetry, it is particularly advantageous to provide in one or both die pistons, one or more elastically mounted auxiliary pistons which additionally act on the molding plates. These auxiliary pistons may be actuated by a hydraulic system is which one can preset pressure (or variation of pressure) during production. In this way, it is possible, for example, with one and the same molding plate to produce different continuous-focus eyeglass lenses, by changing the pressure acting on the auxiliary piston. In addition, for example, one molding plate can also be of toric shape, as to production of continuous-focus eyeglass lenses which are additionally characterized by predetermined astigmatic effects; alternatively, the torically developed surface may be rigid. In this connection, it is particularly advantageous that different astigmatic orientations can be set with one and the same mold, simply by rotating the toric molding plate. Furthermore, two such molding plates can be inclined at an angle to each other, to thereby produce eyeglass lenses of prismatic effect; in a related situation, it is also possible, for example, by rotating an angular intermediate piece, to produce different directions for the prismatic effect, within one and the same mold.

A significant advantage of the invention is that complex molded products having aspherical surfaces can be produced from relatively simple molds having spherical surfaces. The rigidity otherwise required is replaced by a defined deformability. By the additional introduction of elastically mounted auxiliary pistons, different aspherical surfaces which are not of rotational symmetry can be produced with one and the same mold, merely by selecting the pressure or the variation of pressure. There thus results a substantial reduction in mold-construction cost, and there is also a substantial reduction in change-over time, as compared with that previously required for mold replacement.

Another advantage of the invention is that, for some parts, even flat molding plates can be used. This possibility, to be sure, is limited by the tear strength of the materials currently available for molding plates.

DETAILED DESCRIPTION OF THE INVENTION

Several illustrative embodiments of the invention will be described in detail in conjunction with the accompanying drawings, in which.

Figure 1:
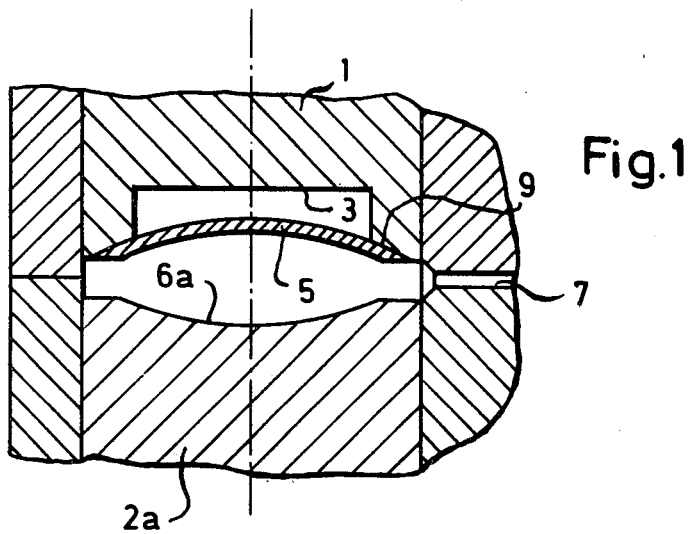
FIG. 1 is a fragmentary longitudinal sectional view to show construction of a mold of the invention, incorporating a deformable molding plate.

In FIG. 1, 1 and 2a are the piston components of a molding die.

Figure 2:
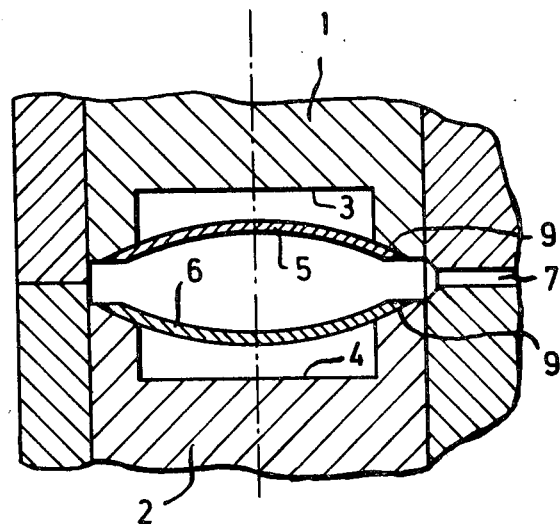
FIG. 2 is a view similar to FIG. 1, to show a modified mold, having two deformable molding plates.

The piston 2a has a conventional rigid molding-cavity surface 6a, but the piston 1 is characterized by a cup-shaped recess 3, and an elastically deformable molding plate 5 is positioned over the latter. In FIG. 2, both pistons 1 and 2 are provided with cup-shaped recesses 3 and 4, and elastically deformable molding plates 5 and 6 are positioned over them. The molding plates 5 and 6 may be connected to their associated pistons 1 and 2, for example by adhesive means at involved supporting shoulder surfaces 9.

In one advantageous embodiment, the edge and clamping conditions are significant in the predetermined deformation of molding plates 5 and 6. This can be effected, for instance, by seating the molding plates on pistons 1 and 2, only at certain limited portions of their circular periphery, and being clamped or otherwise secured in such a pattern of limited seating. At other portions of their circular periphery, a narrow clearance is provided to permit local edge displacement of the molding plate with respect to its associated piston.

The molding plates are made of elastically deformable material, as for example, or tool steel or aluminum with a catalytically applied polishable layer of nickel, and they have spherical surfaces. During the molding process, they are deformed by the pressure of injected material, entering the molding cavity through an injection channel 7; each deformed molding plate thus forms an aspherical surface to produce a molded product with an aspherical surface. The shape of each resulting aspherical surface depends on thickness of the involved molding plate or plates, material of the molding plates, radii of the initial spherical surfaces, die-clamping conditions, and the pressure within the molding cavity during the molding process. The particular aspherical deformation can be predetermined by the finite element method, or else experimentally. The desired deformation is thus predeterminable, so that one may specify how the parameters may be selected, in order to mold a product having a desired aspherical surface, and of course, the parameters can be so selected as to enable molding a product with two different aspherical surfaces. After a given molding cycle and upon removal of the molded product from the mold, it will be understood that the molding plates 5 and 6 again assume their original spherical shape.

Figure 3:
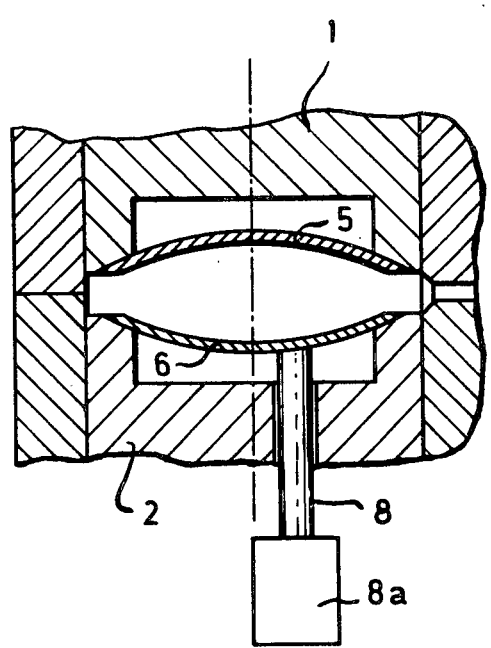
FIG. 3 is another similar view to show a further modified mold, incorporating an auxiliary piston.

FIG. 3 illustrates another embodiment of the invention, capable of producing aspherical surfaces of non-rotational symmetry. The described deformation of molding plate 6 is modified by the action of an elastically mounted auxiliary piston 8, so as to develop an aspherical molding-cavity surface of non-rotational symmetry. Such a piston can be placed at a predetermined location of contact with plate 6. In one advantageous embodiment, it is part of a hydraulic system 8a, by which a predetermined pressure, or variation of pressure with time during the manufacturing process can be established. It will further be understood that the production of aspherical molded-product surfaces of non-rotational symmetry can be aided by the localized edge support and clamping conditions discussed above, i.e., by developing such edge support and clamping conditions with non-rotational symmetry.

Figure 4:
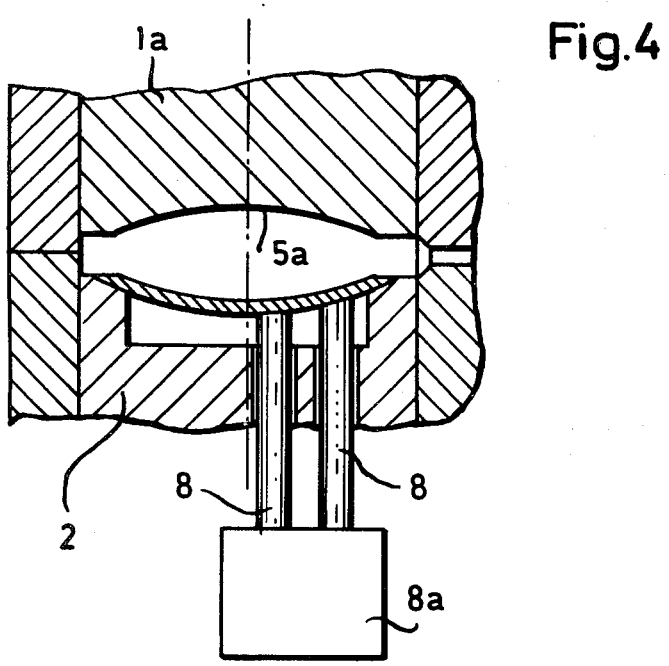
FIG. 4 is a similar view of a modified mold having two auxiliary pistons.

FIG. 4 shows another embodiment having two elastically mounted auxiliary pistons 8 which are also connected to a hydraulic actuating system. In this case, different pressures or variations in pressure can be established for the two auxiliary pistons, to achieve particular aspherical surfaces of non-rotational symmetry.

In the various embodiments, at least one of the deformable molding plates (5) may be of toric development; alternatively, the rigid surface (5a) may be of toric development. Further, the molding-cavity surfaces (5, 6) may be so arranged with respect to each other that planes tangential to their respective center points from an angle with each other.

It will be understood that beyond the spaced-array configuration of two auxiliary pistons 8 in FIG. 4, it is possible to arrange one or more additional auxiliary pistons within one piston 2 and in this way to produce either particularly complex aspherical surfaces of non-rotational symmetry or surfaces which cannot be obtained by variation of the other parameters. Another advantage of a plurality of auxiliary pistons in a given piston component 2 is the greater possibility of variation with one and the same mold and the resultant avoidance of the change-over time when producing a line of molded products having similar but not identically the same surface curvatures.

It is also advantageous to arrange an auxiliary piston in the center, which, to be sure, does not produce any contribution from the standpoint of non-rotational symmetry but does provide a greater possibility of variation. And in one particularly advantageous embodiment of the invention, one or more auxiliary pistons are combined with flat molding plates.

It will be understood that the surfaces by which the auxiliary pistons engage the molding plates may also be other than circular and, for instance, be of elongated shape, to enable a longitudinal or otherwise characterized distribution of auxiliary-piston contribution to ultimate molding-plate deformation.

What is claimed is:

1. A method of forming a molded thermoplastic product having opposed surfaces at least one of which is aspherical, which method comprises selecting for the formation of said one surface a molding plate of elastically deformable material and having a spherical surface, selecting a mold having a molding-plate support for said plate in spaced opposed relation with a cavity formation for the other of said surfaces, the selected mold having a recessed region behind said support, mounting the selected plate on said support and over the recessed region, injecting thermoplastic material to fill said mold between said plate and said cavity formation and under sufficiently elevated pressure to elastically deform the surface of said plate to asphericity and to complete the molding of the product to such asphericity before removing the product from the mold.

2. A method of forming a molded thermoplastic product with opposed aspherical surfaces, which method comprises selecting two molding plates of elastically deformable material and having spherical surfaces, selecting a mold having a molding-plate support for each of said plates in spaced opposed relation and with a recessed region behind each of said supports, mounting the selected plates in said supports and over the respective recessed regions, injecting thermoplastic material to fill said mold between said plates and under sufficiently elevated pressure to elastically deform the surfaces of said plates to asphericity and to complete the molding of the product to such asphericity before removing the product from the mold.

3. The method of claim 1 or claim 2, in which the selected die and molding plates and thermoplastic material are selected for the formation of eyeglass lenses.

4. The method of claim 1, in which the mounting of the selected plates is characterized by clamping the molding plate to the support around the periphery of the recessed region.

5. The method of claim 4, in which the clamping is peripherally continuous.

6. The method of claim 4, in which the clamping is peripherally discontinuous, to the extent permitting local edge displacement of the molding plate in the course of its elastic deformation.

7. The method of claim 1, in which the mold is selected for rigidity at the cavity formation for said other surface, whereby the aspheric character of the molded product is limited to said one surface.

8. The method of claim 1, in which the selected mold includes an auxiliary piston actuable by hydraulic pressure for restraining abutment with a local region of the recess-confronting surface of the molding plate, and in which the hydraulic pressure is under predetermined control while the thermoplastic material is under elevated pressure.

9. The method of claim 8, in which the hydraulic pressure is variably controlled while the thermoplastic material is under elevated pressure.

10. The method of claim 1, in which the selected mold includes two auxiliary pistons actuable by hydraulic pressure for restraining abutment with spaced local regions of the recess-confronting surface of the molding plate, and in which the hydraulic pressure is under predetermined control while the thermoplastic material is under elevated pressure.

11. The method of claim 10, in which the actuating hydraulic pressure for at least one of said auxiliary pistons is variably controlled while the thermoplastic material is under elevated pressure.

12. The method of claim 8, wherein the selected mold, auxiliary piston, and mold plate are used to form molded products with different aspherical surfaces, comprising molding a first product using a first selected hydraulic pressure or predetermined variation thereof, and molding a second product using a different selected hydraulic pressure or predetermined variation thereof.

13. The method of claim 6, in which the selected molding plate is circular and in which the peripherally discontinuous clamping is asymmetric with respect to the circular center of the molding plate.

* * * * *